(12) United States Patent
Hoshi et al.

(10) Patent No.: US 12,077,148 B2
(45) Date of Patent: Sep. 3, 2024

(54) CONTROL METHOD FOR HYBRID VEHICLE AND CONTROL DEVICE FOR HYBRID VEHICLE

(71) Applicant: NISSAN MOTOR CO., LTD., Yokohama (JP)

(72) Inventors: Kiyoshi Hoshi, Kanagawa (JP); Kenichi Gotou, Kanagawa (JP); Azusa Kobayashi, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 244 days.

(21) Appl. No.: 17/629,947

(22) PCT Filed: Jul. 26, 2019

(86) PCT No.: PCT/JP2019/029498
§ 371 (c)(1),
(2) Date: Jan. 25, 2022

(87) PCT Pub. No.: WO2021/019618
PCT Pub. Date: Feb. 4, 2021

(65) Prior Publication Data
US 2023/0347866 A1 Nov. 2, 2023

(51) Int. Cl.
*B60W 20/13* (2016.01)
*B60W 10/06* (2006.01)
(Continued)

(52) U.S. Cl.
CPC ........... *B60W 20/13* (2016.01); *B60W 10/06* (2013.01); *B60W 10/08* (2013.01); *B60W 20/16* (2016.01);
(Continued)

(58) Field of Classification Search
CPC ...... B60W 20/13; B60W 10/06; B60W 10/08; B60W 20/16; B60W 20/20;
(Continued)

(56) References Cited

U.S. PATENT DOCUMENTS

| | | |
|---|---|---|
| 5,909,720 A | 6/1999 | Yamaoka et al. |
| 2001/0035159 A1 | 11/2001 | Tsunooka |

(Continued)

FOREIGN PATENT DOCUMENTS

| | | |
|---|---|---|
| CN | 109263630 A | 1/2019 |
| JP | 2001-123857 A | 5/2001 |

(Continued)

*Primary Examiner* — Yi-Kai Wang
(74) *Attorney, Agent, or Firm* — Foley & Lardner LLP

(57) ABSTRACT

A control method for a hybrid vehicle is provided. The hybrid vehicle includes: a power generator that charges a battery using power of an engine; an electric motor that drives a driving wheel by electric power of the battery; a particulate filter that collects particulate matters contained in exhaust gas from the engine. In the control method, electric power is supplied from the battery to the power generator to perform a motoring operation of rotating the engine by the power generator to supply air to the particulate filter when particulate matters of a first predetermined amount or more are accumulated in the particulate filter. And motoring operation is prohibited even if the particulate filter is accumulated with particulate matters of the first predetermined amount or more when a predetermined first condition that a driver does not intend a motoring operation is satisfied.

8 Claims, 8 Drawing Sheets

(51) Int. Cl.
*B60W 10/08* (2006.01)
*B60W 20/16* (2016.01)
*B60W 20/20* (2016.01)

(52) U.S. Cl.
CPC ..... *B60W 20/20* (2013.01); *B60W 2510/0638* (2013.01); *B60W 2510/0676* (2013.01); *B60W 2510/069* (2013.01); *B60W 2510/244* (2013.01); *B60W 2530/12* (2013.01); *B60W 2710/0694* (2013.01); *B60W 2710/083* (2013.01)

(58) Field of Classification Search
CPC . B60W 2510/0638; B60W 2510/0676; B60W 2510/069; B60W 2510/244; B60W 2530/12; B60W 2710/0694; B60W 2710/083; B60W 2510/0657; B60W 30/1846; B60W 2510/0604; B60W 2710/0666; B60W 10/26; B60W 2555/00; B60W 30/1843; B60W 30/1882; B60W 2710/0605; B60W 30/184; B60W 2510/068; B60W 2710/0644; F01N 2430/00; F01N 2590/11; F01N 9/002; F01N 3/023; F01N 2900/10; Y02T 10/62; B60K 6/46

USPC ............................................................ 701/22
See application file for complete search history.

(56) References Cited

U.S. PATENT DOCUMENTS

| | | | |
|---|---|---|---|
| 2008/0196395 | A1* | 8/2008 | Hashizume ............ F01N 9/002 60/286 |
| 2012/0166030 | A1 | 6/2012 | Utsumi et al. |
| 2019/0023261 | A1* | 1/2019 | Kanayama ................ B60K 6/48 |
| 2020/0398666 | A1 | 12/2020 | Higuchi et al. |
| 2022/0082039 | A1* | 3/2022 | Ishii ................... B01D 46/0086 |

FOREIGN PATENT DOCUMENTS

| | | |
|---|---|---|
| JP | 2002-021604 A | 1/2002 |
| JP | 2002-195068 A | 7/2002 |
| JP | 2009-137405 A | 6/2009 |
| JP | 2009-203934 A | 9/2009 |
| JP | 2015-202832 A | 11/2015 |
| JP | 2016-117451 A | 6/2016 |
| JP | 2019-018719 A | 2/2019 |
| WO | WO 2011/027454 A1 | 3/2011 |
| WO | WO-2019/116575 A1 | 6/2019 |

* cited by examiner

CONTROL METHOD FOR HYBRID VEHICLE AND CONTROL DEVICE FOR HYBRID VEHICLE

TECHNICAL FIELD

The present invention relates to a control method for a hybrid vehicle and a control device for a hybrid vehicle.

BACKGROUND ART

Some so-called series hybrid vehicles, which use an engine for power generation, include a filter (GPF: Gasoline Particulate Filter) that collects particulate matters (PM: Particulate Matter) contained in exhaust gas of the engine. If PM is accumulated in this GPF, clogging may occur, and thus, it is necessary to combust the PM accumulated in the GPF at an appropriate timing to refresh the GPF.

JP2015-202832A discloses an engine control device, which drives an engine to increase the temperature of a filter when PM of a predetermined amount or more is accumulated in the filter which collects PM, and sends air by motoring (forcedly driving the engine) to combust the PM and refresh the filter after the temperature increase.

SUMMARY OF INVENTION

Incidentally, when a motoring operation is performed to combust PM, the engine operation (fuel injection) is stopped and a driving noise is generated due to the motoring operation. Thus, if the motoring operation is performed at a timing not intended by the driver, for example, when charging by power generation of the engine is required or when the driver wants quiet operation with less noise, the comfort of the driver may be impaired.

In view of the above problem, the object of the present invention is to provide a control method for a hybrid vehicle capable of refreshing a GPF without impairing the comfort of the driver.

According to one embodiment of present invention, a control method for a hybrid vehicle is provided. The hybrid vehicle includes: a power generator that charges a battery using power of an engine; an electric motor that drives a driving wheel by electric power of the battery; a particulate filter that collects particulate matters contained in exhaust gas from the engine. In the control method, electric power is supplied from the battery to the power generator to perform a motoring operation of rotating the engine by the power generator to supply air to the particulate filter when particulate matters of a first predetermined amount or more are accumulated in the particulate filter. And motoring operation is prohibited even if the particulate filter is accumulated with particulate matters of the first predetermined amount or more when a predetermined first condition that a driver does not intend a motoring operation is satisfied.

DESCRIPTION OF EMBODIMENTS

First Embodiment

Hereinafter, a hybrid vehicle 100 according to the first embodiment of the present invention is described with reference to the drawings, etc.

Figure 1:
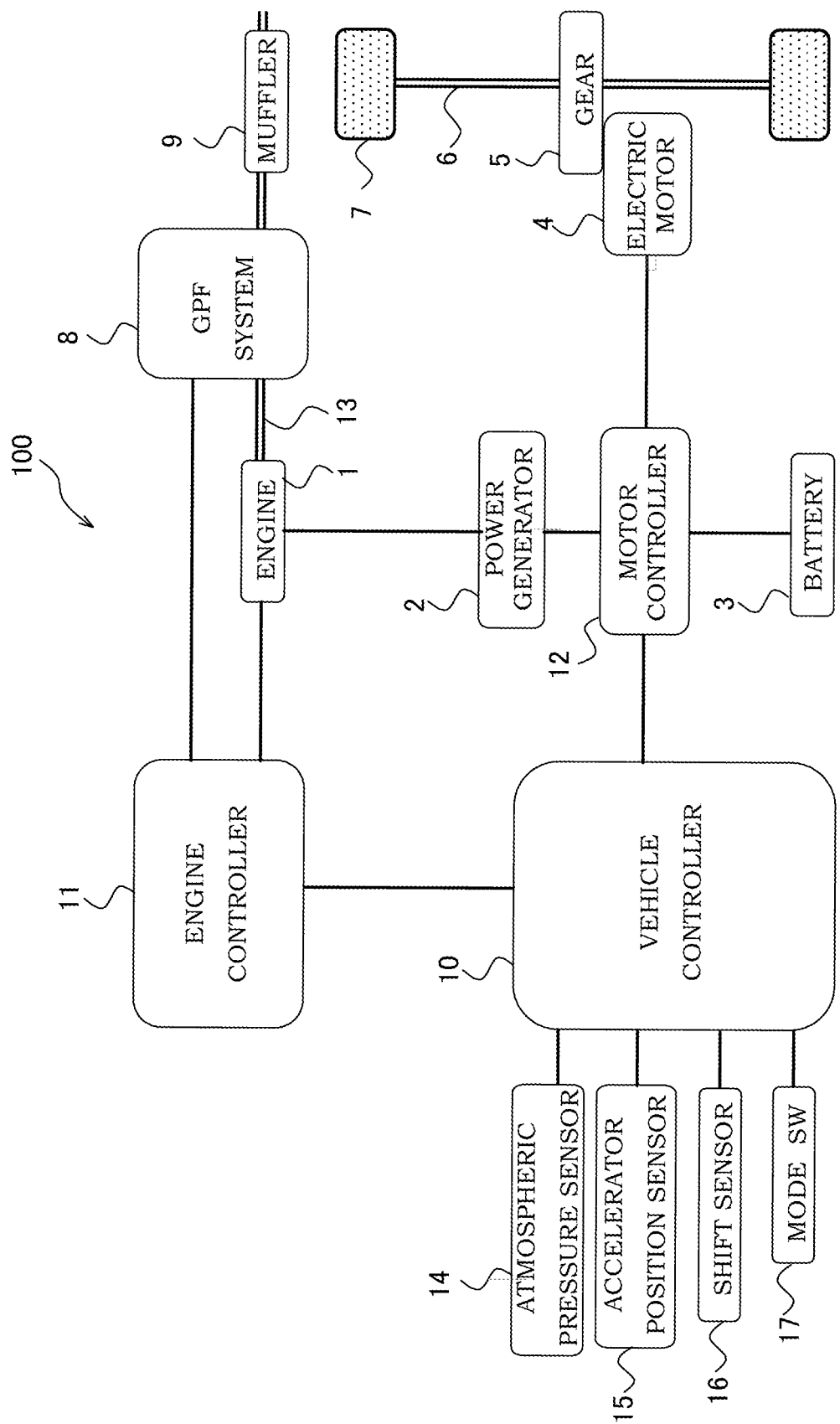
FIG. 1 is a schematic configuration diagram illustrating a main configuration of a hybrid vehicle according to the first embodiment.

FIG. 1 is a schematic configuration diagram illustrating a main configuration of the hybrid vehicle 100 according to the first embodiment.

As shown in FIG. 1, the hybrid vehicle 100 includes an engine 1, a power generator 2, a battery 3, an electric motor 4, a gear 5, an shaft 6, driving wheels 7, a GPF system 8, and a muffler 9. In addition, the hybrid vehicle 100 includes an engine controller 11 that controls the engine 1, a motor controller 12 that controls a driving system, and a vehicle controller 10 that controls the entire hybrid vehicle 100.

The hybrid vehicle 100 is configured as a so-called series type hybrid vehicle in which the power of the engine 1 is used to drive the power generator 2, the electric power generated by this power generator 2 is supplied to the battery 3, and the electric motor 4 is rotated based on the electric power of the battery 3 to drive the driving wheels 7. Therefore, in the hybrid vehicle 100, the power of the engine 1 is basically used not as a power source for driving the vehicle but as a power source for causing the power generator 2 to generate electric power. Further, in a case such that the driving force request of the electric motor 4 cannot be satisfied merely by the electric power of the battery 3, the electric power generated by the engine 1 is directly supplied to the electric motor 4 in addition to the electric power of the battery 3.

The engine 1 is mechanically connected to the power generator 2 via a decelerator (not illustrated). The driving force of the engine 1 is transmitted to the power generator 2, and the power generator 2 generates electric power to charge the battery 3 by the driving force of the engine 1. Further, the power generator 2 is rotated by the electric power of the battery 3 as needed to drive an output shaft of the engine 1. That is, the power generator 2 has a function as a motor generator. Further, the operation of the engine 1 is controlled by the engine controller 11, and the operation of the power generator 2 is controlled by the motor controller 12.

Further, an exhaust passage 13 is connected to the engine 1, and the exhaust passage 13 is provided with the GPF system 8 and the muffler 9 in order from the upstream side. The GPF system 8 includes a gasoline particulate filter (GPF) 81 (see FIG. 2) that collects particulate matters (PM) in the exhaust gas of the engine 1. The operation of the GPF system 8 is controlled by the engine controller 11. The muffler 9 is arranged downstream of the GPF system 8 to reduce exhaust noise and release exhaust gas to the outside. Further, the details of the exhaust system of the engine 1 will be described later.

The engine controller 11 is electrically connected to the engine 1 and the GPF system 8, and is also electrically connected to the vehicle controller 10 that controls the entire hybrid vehicle 100. The engine controller 11 transmits information about the engine 1 and the GPF system 8 to the vehicle controller 10 as a signal, receives a command about the operation of the engine 1 transmitted from the vehicle controller 10, and controls the engine 1 based on the command. The engine controller 11 controls, for example, the throttle opening of the engine 1, the ignition timing by ignition plug, the fuel injection amount from injector, etc. in response to the command from the vehicle controller 10.

The battery 3 is electrically connected to the power generator 2 and the electric motor 4 via the motor controller 12. The battery 3 charges the electric power generated by the power generator 2 and the regenerative electric power of the electric motor 4, and supplies the charged electric power to the electric motor 4.

The electric motor 4 is mechanically connected to the shaft 6 via the gear 5, and the shaft 6 is mechanically connected to the driving wheels 7. The electric motor 4 is rotated by the electric power supplied from the battery 3, and the driving force of the electric motor 4 is transmitted to the driving wheels 7 via the gear 5 and the shaft 6. The hybrid vehicle 100 travels by driving the driving wheels 7 using the driving force of the electric motor 4.

The motor controller 12 is electrically connected to the power generator 2, battery 3, electric motor 4, etc. that constitute the driving system of the hybrid vehicle 100, and is also electrically connected to the vehicle controller 10 that controls the entire hybrid vehicle 100. The motor controller 12 transmits information about the driving system as a signal to the vehicle controller 10, receives a command about the operation of the driving system transmitted from the vehicle controller 10, and controls the operation of the driving system, including the power generator 2, battery 3, electric motor 4, etc., based on the command.

The vehicle controller 10 is electrically connected to an atmospheric pressure sensor 14, an accelerator position sensor 15, a shift sensor 16, a mode switch 17, etc. Further, the vehicle controller 10 is electrically connected to the engine controller 11 that controls the operation of the engine 1 and the motor controller 12 that controls the operation of the driving system.

The atmospheric pressure sensor 14 detects the atmospheric pressure outside the vehicle. The accelerator position sensor 15 detects the operation amount of the accelerator pedal (accelerator opening). The shift sensor 16 detects the position of shift lever.

The mode switch 17 is a switch for switching the traveling modes of the hybrid vehicle 100, and the traveling modes include a normal mode and an EV priority traveling mode (manner mode). In the normal mode, the battery 3 is charged by the regenerative electric power of the electric motor 4, the engine 1 is driven as needed, and the power generator 2 generates electric power to charge the battery 3. In the EV priority traveling mode, the engine 1 is not driven and the battery 3 is not charged by the power generator 2. The EV priority traveling mode is suitable for traveling in a residential area, etc. because the engine 1 does not generate electric power and no engine noise is generated. In addition, the traveling modes include a charge mode in which the electric power generation of the power generator 2 by the driving force of the engine 1 is preferentially performed to increase the charge amount of the battery 3. In addition, the traveling modes may include an eco-mode, etc. that can be started and stopped through a mere accelerator operation by generating a regenerative torque larger than that in the normal mode when the accelerator is released.

The information detected by each sensor, the set traveling mode information, and the information from the engine controller 11 and the motor controller 12 are transmitted to the vehicle controller 10 as signals.

The vehicle controller 10 is constituted of a general-purpose electronic circuit including a microcomputer, a microprocessor, and a CPU, and peripheral devices, and executes a specific program to perform processes for controlling the hybrid vehicle 100. The vehicle controller 10, for example, sends a command to the engine controller 11 and the motor controller 12 based on information about each sensor, traveling mode, information about the engine 1 and the GPF system 8, and information about the driving system, and performs a motoring control based on a PM accumulated amount to be described later.

Figure 2:
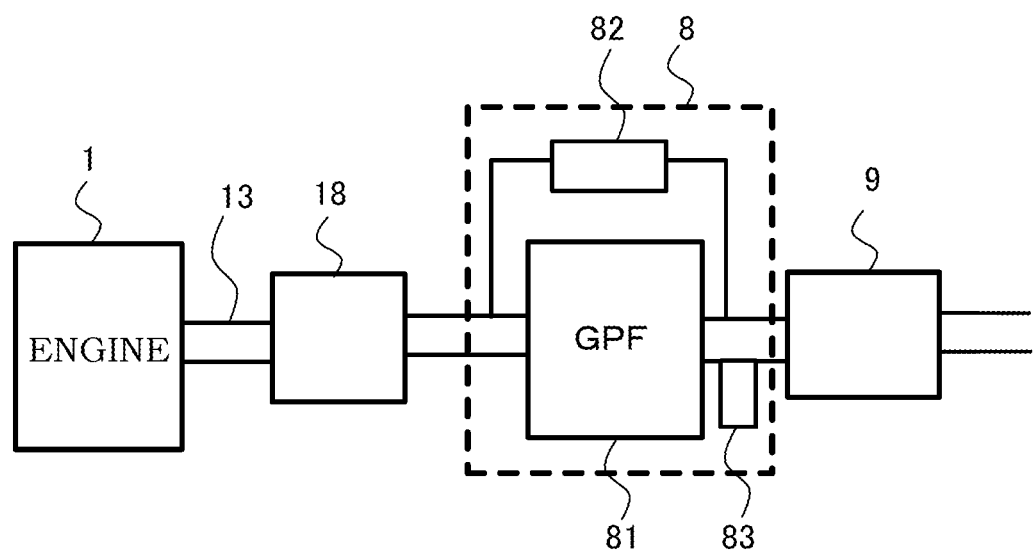
FIG. 2 is a schematic configuration diagram illustrating a main configuration of an exhaust system.

FIG. 2 is a schematic configuration diagram illustrating the main configuration of the exhaust system of the hybrid vehicle 100. As shown in FIG. 2, the engine 1 is connected to the exhaust passage 13 that circulates the exhaust gas discharged from the engine 1. A catalyst converter 18, the GPF system 8, and the muffler 9 are arranged in the exhaust passage 13 in order from the upstream side of exhaust gas flow.

The catalyst converter 18 contains an exhaust purification catalyst such as a three-way catalyst and is arranged on the upstream side of the GPF system 8. The catalyst converter 18 purifies the exhaust gas by oxidizing uncombusted components such as HC and CO contained in the exhaust gas of the engine 1 and reducing oxidized components such as NOx contained in the exhaust gas of the engine 1. Moreover, a catalyst converter may be further arranged on the downstream side of the GPF system 8.

The GPF system 8 includes a gasoline particulate filter (GPF) 81, a differential pressure sensor 82 that detects the differential pressure Pdif between the upstream side and the downstream side of the GPF 81, and a GPF temperature sensor 83 that detects the temperature T of the GPF 81. The GPF system 8 is connected to the engine 1 via the exhaust passage 13. In addition, the GPF system 8 is electrically connected to the engine controller 11.

The GPF 81 is a filter that collects particulate matters (PM) in the exhaust gas of the engine 1. The differential pressure sensor 82 detects the differential pressure Pdif between the exhaust pressure at the inlet of the GPF 81 and the exhaust pressure at the outlet of the GPF 81. The detected differential pressure Pdif is transmitted as a signal to the vehicle controller 10 via the engine controller 11. The vehicle controller 10 estimates a PM accumulated amount S of the GPF 81 based on the differential pressure Pdif.

The GPF temperature sensor 83 is provided in the exhaust passage 13 of the portion connected to the outlet of the GPF 81, and detects a GPF temperature T, which is the bed temperature of the GPF. The detected GPF temperature T is transmitted as a signal to the vehicle controller 10 via the engine controller 11. Further, an exhaust gas temperature sensor for detecting the exhaust gas temperature of the engine 1 may be further provided in the exhaust passage 13 on the upstream side of the GPF 81.

The muffler 9 is arranged downstream of the GPF system 8 to reduce the exhaust noise of passing exhaust gas.

According to the above configuration, the exhaust gas from the engine 1 flows through the exhaust passage 13, is purified by the catalytic converter 18, removed of PM by the GPF 81, and then discharged from the muffler 9 to the outside.

Figure 3:
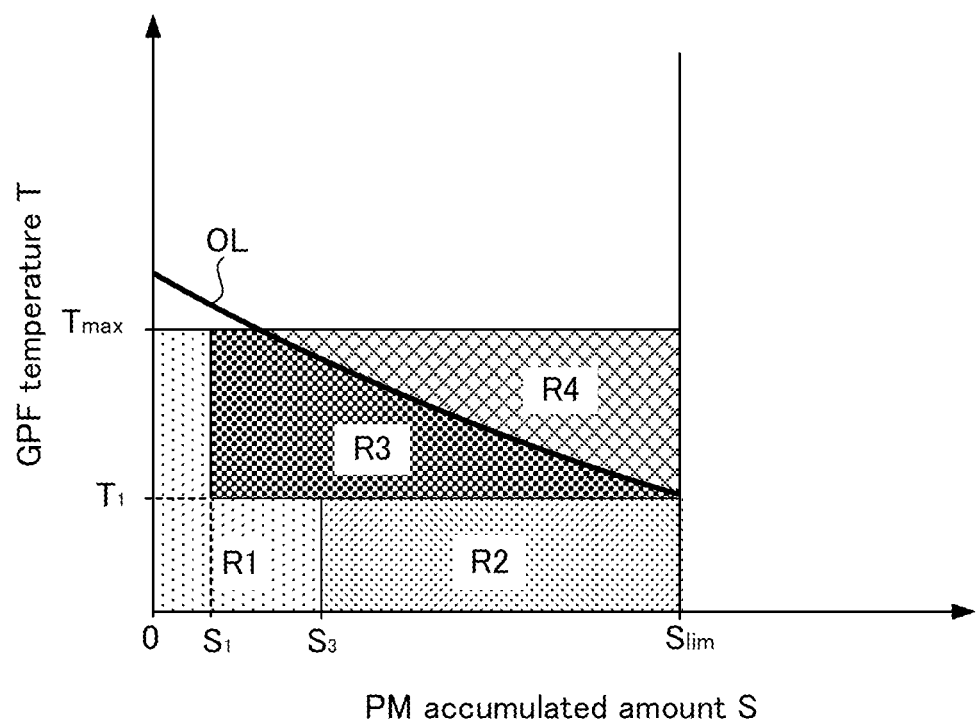
FIG. 3 is a diagram illustrating a relation between GPF temperature and PM accumulated amount and motoring operation.

FIG. 3 is a diagram illustrating a relation between the GPF temperature and PM accumulated amount and a motoring operation. In FIG. 3, the region R1 is a normal operation region, R2 is a GPF temperature increasing region, R3 is a motoring region, and R4 is a motoring prohibiting region. Further, a maximum GPF temperature Tmax is the GPF temperature T when the exhaust gas temperature of the engine 1 is the maximum temperature, and the GPF temperature T normally does not exceed this maximum GPF temperature Tmax. Therefore, a state point determined by the PM accumulated amount S and the GPF temperature T is not included in a region located at a higher temperature side of the maximum GPF temperature Tmax.

In the normal operation region R1, since the PM accumulated amount S accumulated in the filter is small, GPF regeneration is not necessary, no motoring operation is performed for that purpose, and the hybrid vehicle 100 is controlled according to a set traveling mode.

When PM of a predetermined amount (first predetermined amount) $S_1$ or more is accumulated in the GPF, if the GPF temperature T is equal to or higher than a PM combustible temperature $T_1$ (that is, when the state point is in the region R3), the vehicle controller 10 performs a motoring operation. The motoring operation means that the power generator 2 drives the output shaft of the engine 1 forcedly. By motoring, air is sent into the high-temperature GPF 81, the combustion of PM accumulated in the GPF 81 is promoted, and the GPF 81 is refreshed.

On the other hand, when the GPF temperature T is lower than the PM combustible temperature $T_1$ and PM of a PM accumulated amount $S_3$ of the start of temperature increase or more is accumulated in the GPF 81 (that is, when the state point is in the GPF temperature increasing region R2), the vehicle controller 10 first drives the engine 1. When the engine 1 is driven, the exhaust gas temperature of the engine 1 rises and the temperature of the GPF 81 is increased. When the temperature of the GPF 81 is increased to the PM combustible temperature $T_1$ or higher, the PM accumulated in the GPF 81 begins to combust. In the motoring region R3 where the GPF temperature T is equal to or higher than the PM combustible temperature $T_1$, the fuel injection of the engine 1 is stopped and a motoring operation is performed. As described above, by motoring, air is sent into the high-temperature GPF 81, the combustion of PM accumulated in the GPF 81 is promoted, and the GPF 81 is refreshed. In this way, when the GPF temperature T is lower than the PM combustible temperature $T_1$, the engine drive first increases the temperature of the GPF 81, and then the motoring operation is performed.

Further, from the viewpoint of fuel efficiency, etc., it is preferable to avoid the engine drive for increasing the temperature of the GPF as much as possible, and thus, it is preferable that the PM accumulated amount $S_3$ of the start of temperature increase, which is the threshold value of the PM accumulated amount for driving the engine 1, is set to a value larger than the first predetermined amount $S_1$, which is the threshold value of the PM accumulated amount for performing the motoring operation.

As described above, when PM of the first predetermined amount $S_1$ or more is accumulated, the GPF 81 is refreshed by motoring. However, if the PM accumulated amount S of the GPF 81 exceeds the allowable limit amount $S_{lim}$ for some reason, the vehicle controller 10 gives a warning like heading to the dealer to the driver, and prompts the driver to replace components of the GPF 81, etc.

Next, the curve OL in FIG. 3 represents an output limiting curve. The output limiting curve OL shows the relation between the PM accumulated amount S and the allowable GPF temperature. The allowable GPF temperature is the upper limit value of the GPF temperature T according to the motoring of the engine 1, and is set according to the PM accumulated amount S as the upper limit value of the GPF temperature T, by which the temperature of the GPF 81 is not increased excessively due to the combustion of PM, according to the motoring of the engine 1. As can be understood from the output limiting curve OL, the allowable GPF temperature decreases as the PM accumulated amount S increases. This is because the larger the PM accumulated amount S, the larger the temperature increase of the GPF 81 when motoring is performed.

When the GPF temperature T exceeds the allowable GPF temperature, that is, in the region on the higher temperature side of the output limiting curve OL in FIG. 3 (motoring prohibiting region R4), motoring may increase the temperature of the GPF 81 excessively which may in turn cause deterioration of the GPF 81. Therefore, when the GPF temperature T exceeds the allowable GPF temperature (that is, in the region R4), the vehicle controller 10 stops the drive of the output shaft of the engine 1 by the power generator 2 and prohibits motoring operation. Further, in the motoring region R3, since the fuel injection of the engine 1 is stopped, the GPF temperature T does not rise due to the engine exhaust gas temperature, and normally, the state point never comes to the region on the higher temperature side of the output limiting curve OL (motoring prohibiting region R4).

In this way, when PM of the first predetermined amount $S_1$ or more is accumulated in the GPF, if the GPF temperature T does not exceed the allowable GPF temperature, the combustion of the PM accumulated in the GPF 81 is promoted by motoring to refresh the GPF 81. However, when a motoring operation is performed, the engine operation (fuel injection) is stopped and a driving noise is generated due to the motoring operation. Thus, if the motoring operation is performed at a timing not intended by the driver, for example, when charging by power generation of the engine is required or when the driver wants quiet operation with less noise, the comfort of the driver may be impaired. Therefore, in this embodiment, as shown in the motoring control based on PM accumulated amount to be described below, when a predetermined condition (first condition) in which the driver does not intend a motoring operation is satisfied, motoring operation is prohibited even if PM of the first predetermined amount $S_1$ or more is accumulated.

Figure 4:
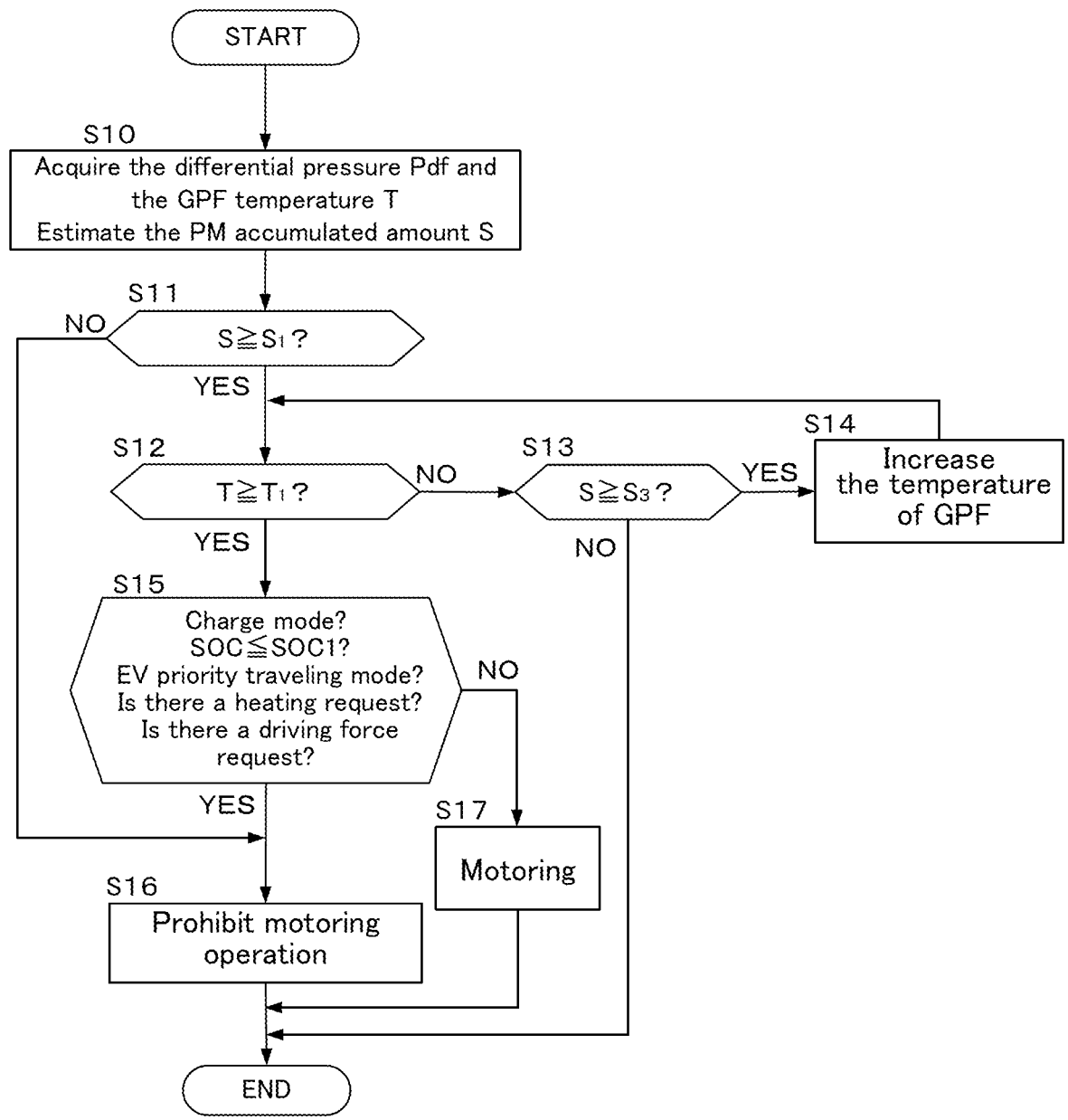
FIG. 4 is a flowchart illustrating a motoring control based on PM accumulated amount in the first embodiment.

FIG. 4 is a flowchart illustrating the motoring control based on PM accumulated amount in the hybrid vehicle 100 of the first embodiment. It is noted that the following controls are each executed by the vehicle controller 10 at regular intervals.

In Step S10, the vehicle controller 10 receives the signal of the differential pressure Pdif and the signal of the GPF temperature T from the GPF system 8 and estimates the PM accumulated amount S of the GPF 81 based on the differential pressure Pdif.

In Step S11, the vehicle controller 10 determines whether the PM accumulated amount S of the GPF 81 is equal to or larger than the first predetermined amount $S_1$. If the PM accumulated amount S is less than the first predetermined amount $S_1$, GPF regeneration is not required, and the process proceeds to Step S16, and the vehicle controller 10 does not perform a motoring operation and terminates the process of the motoring control based on PM accumulated amount.

On the other hand, when the PM accumulated amount S is equal to or larger than the first predetermined amount $S_1$, the vehicle controller 10 executes the process of Step S12.

In Step S12, the vehicle controller 10 determines whether the temperature T of the GPF 81 is equal to or higher than the PM combustible temperature $T_1$. If the temperature T of the GPF 81 is equal to or higher than the PM combustible temperature $T_1$, the vehicle controller 10 executes the process of Step S15.

On the other hand, if the temperature T of the GPF 81 is lower than the PM combustible temperature $T_1$, the vehicle controller 10 executes the process of Step S13.

In Step S13, the vehicle controller 10 determines whether the PM accumulated amount S of the GPF 81 is equal to or larger than the PM accumulated amount $S_3$ of the start of temperature increase. If the PM accumulated amount S is less than the PM accumulated amount $S_3$ of the start of temperature increase, the state point is in the normal operation region R1 and the vehicle controller 10 terminates the process of the motoring control based on PM accumulated amount.

On the other hand, if the PM accumulated amount S of the GPF 81 is equal to or larger than the PM accumulated amount $S_3$ of the start of temperature increase, a controller 50 executes the process of Step S14.

In Step S14, the controller 50 drives the engine 1, increases the temperature T of the GPF 81, and returns to the process of Step S12. The temperature of the GPF 81 is increased until it reaches the PM combustible temperature $T_1$, and when it is determined in Step S12 that the PM combustible temperature $T_1$ has been reached, the vehicle controller 10 executes the process of Step S15.

When the GPF temperature is equal to or higher than the PM combustible temperature $T_1$, in Step S15, the vehicle controller 10 determines whether or not the predetermined first condition that the driver does not intend a motoring operation is satisfied.

Specifically, the vehicle controller 10, for example, determines whether the vehicle is set to the charge mode, whether the SOC of the battery 3 is equal to or less than a predetermined value SOC 1, whether the vehicle is set to the EV priority traveling mode, whether there is a heating request, whether there is a driving force request, etc. If any of these apply, it is determined that the first condition is satisfied. When the first condition is satisfied, the process proceeds to Step S16, and the vehicle controller 10 prohibits motoring operation and terminates the process of the motoring control based on PM accumulated amount.

Thus, in this embodiment, when the predetermined first condition that the driver does not intend a motoring operation is satisfied, motoring operation is prohibited even if the PM accumulated amount S of the GPF 81 is equal to or larger than the first predetermined amount $S_1$. This prevents the comfort of the driver from being impaired due to performing a motoring operation at a timing which is not intended by the driver. That is, motoring operation is prohibited when any of the below conditions apply: the vehicle is set to the charge mode, the SOC of the battery 3 is equal to or less than the predetermined value SOC 1, the vehicle is set to the EV priority traveling mode, there is a heating request, or there is a driving force request. When the charge mode is set, the driver is requesting to charge the battery 3, and intends to prioritize the power generation of the power generator 2 by the driving force of the engine 1 to increase the charge amount of the battery 3. That is, the driver does not intend to stop the fuel injection of the engine and perform a motoring operation. Further, when the SOC of the battery 3 is low (equal to or less than the predetermined value SOC 1), the driver also expects to charge the battery 3 by the power generation of the power generator 2, and thus does not intend to stop the fuel injection of the engine and perform a motoring operation. Therefore, if a motoring operation is performed at these timings, the required electric power may fail to be charged to the battery 3, and the comfort of the driver may be impaired. Further, in the EV priority traveling mode, the driver intends to drive quietly with less noise, and does not intend to perform a motoring operation which generates driving noise. Therefore, if a motoring operation is performed at this timing, the comfort of the driver may be impaired by the driving noise caused by the motoring operation. Also, if there is a heating request, the driver does not intend to stop the fuel injection of the engine and perform a motoring operation because it is necessary to drive the engine 1 to raise the water temperature of the engine 1. Further, for example, when a driving force for acceleration is requested or when the load is heavy and a driving force is requested (that is, when there is a driving force request), etc., it is necessary to drive the engine 1 to charge the battery 3 and, in some cases, supply the electric power generated by the engine 1 directly to the electric motor 4. Thus, in this case, the driver also does not intend to stop the fuel injection of the engine and perform a motoring operation. Therefore, in these cases, if the fuel injection of the engine is stopped and a motoring operation is performed, the heating request or the driving force request may fail to be satisfied and the comfort of the driver may be impaired.

As described above, in this embodiment, when the driver intends to suppress noise or when it is necessary to drive the engine 1, motoring operation is prohibited even if the GPF is accumulated with PM of the first predetermined amount $S_1$ or more.

Further, the first condition is not limited to the above cases, and other than the above, the first condition may include cases where inconvenience occurs in relation to the performance of other components when the engine is stopped and a motoring operation is performed due to unintended timing of the driver or GPF regeneration.

If it is determined in Step S15 that the predetermined first condition is not satisfied, the vehicle controller 10 executes the process of Step S17.

In Step S17, the vehicle controller 10 performs a motoring operation. By motoring, air is sent to the high-temperature GPF 81, PM combustion is promoted, and the GPF 81 is refreshed. When the GPF 81 is refreshed and the differential pressure Pdif becomes equal to or less than a predetermined value, the vehicle controller 10 terminates the process of the motoring control based on PM accumulated amount.

Further, since the above control is performed at regular intervals, in the motoring region R3 of FIG. 3, even when the predetermined first condition is once satisfied and motoring operation is once prohibited, if the first condition is not satisfied thereafter, the vehicle controller 10 will perform a motoring operation and refresh the GPF 81. Therefore, normally, the PM accumulated amount S of the GPF 81 does not exceed the allowable limit amount $S_{lim}$.

According to the hybrid vehicle 100 in the first embodiment described above, the following effects can be obtained.

The hybrid vehicle 100 performs a motoring operation to supply air to the GPF 81 when PM (particulate matters) of the first predetermined amount Si or more is accumulated in the GPF 81 (particulate filter). Thereby, the combustion of the PM accumulated in the GPF 81 is promoted, and the GPF 81 is refreshed. On the other hand, when the predetermined first condition that the driver does not intend a motor operation is satisfied, motoring operation is prohibited even if PM (particulate matters) of the first predetermined amount Si or more is accumulated. Thereby, it is possible to prevent the comfort of the driver from being impaired by performing a motoring operation at an unintended timing of the driver in order to increase the temperature of the GPF 81. In this way, when PM of the first predetermined amount $S_1$ or more is accumulated, motoring is performed to refresh the GPF 81, and motoring operation is prohibited when the first condition is satisfied, and thus, the GPF can be refreshed without impairing the comfort of the driver.

Next, the hybrid vehicle 100 prohibits motoring operation when the charge mode, in which the driver requests to charge the battery 3, is set. When the charge mode is set, the driver intends to prioritize the power generation of the power generator 2 by the driving force of the engine 1 to increase the charge amount of the battery 3. That is, the driver does not intend to stop the fuel injection of the engine and perform a motoring operation. Therefore, if a motoring operation is performed against the driver's intention when the charge mode is set, the required electric power may fail to be charged to the battery 3, and the comfort of the driver may be impaired. In contrast, in this embodiment, motoring operation is prohibited when the charge mode is set. Thereby, it is possible to prevent the required electric power from failing to be charged to the battery 3 and the comfort of the driver from being impaired due to performing a motoring operation at an unintended timing of the driver in order to refresh the GPF 81.

Further, the hybrid vehicle 100 prohibits motoring operation when the SOC of the battery is equal to or less than the predetermined value SOC 1. When the battery 3 has a low SOC (equal to or less than the predetermined value SOC 1), the driver expects to charge the battery 3 by the power generation of the power generator 2 using the driving force of the engine 1. That is, the driver does not intend to stop the fuel injection of the engine and perform a motoring operation. Therefore, if a motoring operation is performed when the SOC of the battery is equal to or less than the predetermined value SOC 1, the required electric power may fail to be charged to the battery 3, and the comfort of the driver may be impaired. In contrast, in this embodiment, motoring operation is prohibited when the SOC of the battery is equal to or less than the predetermined value SOC 1. Thereby, it is possible to prevent the required electric power from failing to be charged to the battery 3 and the comfort of the driver from being impaired due to performing a motoring operation at an unintended timing of the driver in order to refresh the GPF 81.

Further, the hybrid vehicle 100 prohibits motoring operation when the hybrid vehicle 100 is set to the EV priority traveling mode, in which charging by the engine 1 is restricted. Thereby, when traveling in a residential area or the like in the EV priority traveling mode, it is possible to prevent a motoring operation from being performed at a timing not intended by the driver in order to increase the temperature of the GPF 81, and prevent the comfort of the driver from being impaired by the driving noise caused by the motoring operation.

Further, the hybrid vehicle 100 prohibits motoring operation when there is a heating request. If there is a heating request, the driver does not intend to stop the fuel injection of the engine and perform a motoring operation because it is necessary to drive the engine 1 to raise the water temperature of the engine 1. Therefore, when there is a heating request, if the fuel injection of the engine is stopped and a motoring operation is performed, the heating request cannot be satisfied, and the comfort of the driver may be impaired. In contrast, in this embodiment, motoring operation is prohibited when there is a heating request. Thereby, it is possible to prevent the heating request from failing to be satisfied and the comfort of the driver from being impaired due to performing a motoring operation at an unintended timing of the driver in order to refresh the GPF 81.

Further, the hybrid vehicle 100 prohibits motoring operation when there is a driving force request. When there is a driving force request, it is necessary to drive the engine 1 to charge the battery 3 and, in some cases, supply the electric power generated by the engine 1 directly to the electric motor 4. Therefore, when there is a driving force request, if the fuel injection of the engine is stopped and a motoring operation is performed, the driving force request cannot be satisfied, and the comfort of the driver may be impaired. In contrast, in this embodiment, motoring operation is prohibited when there is a driving force request. Thereby, it is possible to prevent the driving force request from failing to be satisfied and the comfort of the driver from being impaired due to performing a motoring operation at an unintended timing of the driver in order to refresh the GPF 81.

Second Embodiment

A hybrid vehicle 100 according to the second embodiment is described with reference to FIG. 5 and FIG. 6. Note that a component similar to a component in the first embodiment has the same reference sign as used in the first embodiment, and a description thereof is omitted.

Figure 5:
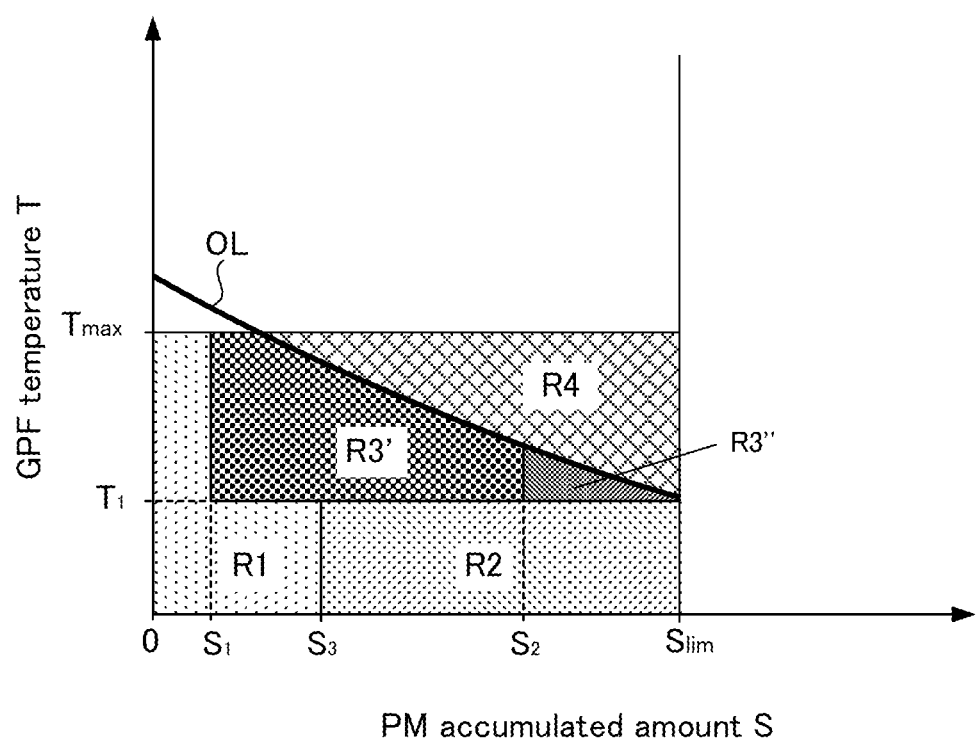
FIG. 5 is a diagram illustrating a relation between GPF temperature and PM accumulated amount and motoring operation in the second embodiment.

FIG. 5 is a diagram illustrating how the GPF temperature and PM accumulated amount are related to the motoring operation in the hybrid vehicle 100 according to the second embodiment. This embodiment differs from the first embodiment in that the motoring region R3 in the first embodiment is divided into a motoring region R3' and a forced motoring region R3".

In FIG. 5, the region R1 is a normal operation region, R3 is a GPF temperature increasing region, R3' is a motoring region, R3" is a forced motoring region, and R4 is a motoring prohibiting region.

Similar to the first embodiment, in the normal operation region R1, since the PM accumulated amount S accumulated in the filter is small, no engine control for GPF regeneration is performed, and the hybrid vehicle 100 is controlled according to a set traveling mode.

When PM of the first predetermined amount $S_1$ or more is accumulated in the GPF, if the GPF temperature T is equal to or higher than the PM combustible temperature $T_1$, that is, in the motoring region R3', the vehicle controller 10 performs a motoring operation, promotes the combustion of PM and refreshs the GPF 81.

However, as in the first embodiment, when the predetermined first condition in which the driver does not intend a motoring operation is satisfied, the vehicle controller 10 prohibits motoring operation in the motoring region R3'.

However, if motoring operation is always prohibited when the predetermined first condition is satisfied, the PM accumulated amount S in the GPF 81 may exceed the allowable limit amount $S_{lim}$ while the first condition remains satisfied. Therefore, in this embodiment, when PM of the second predetermined amount S 2, which is larger than the first predetermined amount $S_1$, or more is accumulated in the GPF 81, if the GPF temperature is equal to or higher than the PM combustible temperature $T_1$ (that is, when the state point is in the region R3"), the vehicle controller 10 performs a motoring operation even when the predetermined first condition is satisfied. As described above, in this embodiment, a motoring operation is forcibly performed and the GPF 81 is refreshed in the forced motoring region R3" regardless of whether the first condition is satisfied.

In this way, by providing the forced motoring region R3" in which a motoring operation is performed more forcibly, it is possible to more reliably prevent the PM accumulated amount S of the GPF 81 from exceeding the allowable limit amount $S_{lim}$.

Further, similar to the first embodiment, when the GPF temperature T is lower than the PM combustible temperature $T_1$ and PM of the PM accumulated amount $S_3$ of the start of temperature increase or more is accumulated in the GPF 81 (that is, when the state point is in the GPF temperature increasing region R2), the engine drive first increases the temperature of the GPF 81. When the GPF temperature T reaches the PM combustible temperature $T_1$, a motoring operation is performed in the motoring region R3' or the forced motoring region R3".

Figure 6:
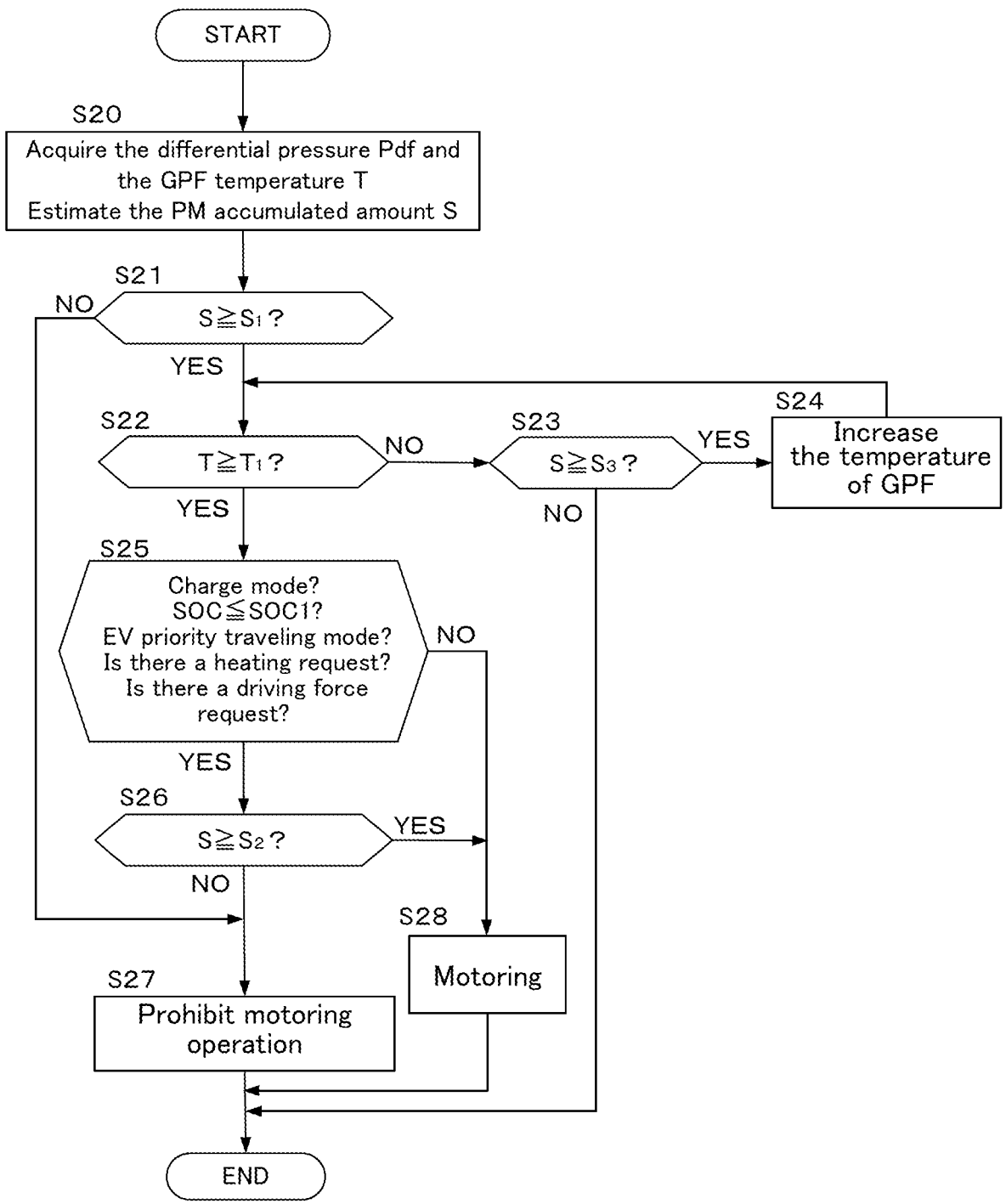
FIG. 6 is a flowchart illustrating a motoring control based on PM accumulated amount in the second embodiment.

FIG. 6 is a flowchart illustrating the motoring control based on PM accumulated amount in the hybrid vehicle 100 of the second embodiment. Further, the following controls are each executed by the vehicle controller 10 at regular intervals.

In Step S20, the vehicle controller 10 receives the signal of the differential pressure Pdif and the signal of the GPF temperature T from the GPF system 8 and estimates the PM accumulated amount S of the GPF 81 based on the differential pressure Pdif.

In Step S21, the vehicle controller 10 determines whether the PM accumulated amount S of the GPF 81 is equal to or larger than the first predetermined amount $S_1$. If the PM accumulated amount S is less than the first predetermined amount $S_1$, GPF regeneration is not required, and the process proceeds to Step S27, and the vehicle controller 10 does not perform a motoring operation and terminates the process of the motoring control based on PM accumulated amount.

On the other hand, in Step S21, when the PM accumulated amount S is equal to or larger than the first predetermined amount $S_1$, the vehicle controller 10 executes the process of Step S22.

In Step S22, the vehicle controller 10 determines whether the temperature T of the GPF 81 is equal to or higher than the PM combustible temperature $T_1$. If the temperature T of the GPF 81 is equal to or higher than the PM combustible temperature $T_1$, the vehicle controller 10 executes the process of Step S25.

On the other hand, if the temperature T of the GPF 81 is lower than the PM combustible temperature $T_1$, the process proceeds to Step S23 and the vehicle controller 10 determines whether the PM accumulated amount S of the GPF 81 is equal to or larger than the PM accumulated amount $S_3$ of the start of temperature increase. If the PM accumulated amount S is less than the PM accumulated amount $S_3$ of the start of temperature increase, the state point is in the normal operation region R1, and thus, the vehicle controller 10 terminates the process of the motoring control based on PM accumulated amount.

On the other hand, if the PM accumulated amount S of the GPF 81 is equal to or larger than the PM accumulated amount $S_3$ of the start of temperature increase, the process proceeds to Step S24, and the controller 50 drives the engine 1, increases the temperature T of the GPF 81, and returns to the process of Step S22. The temperature of the GPF 81 is increased until it reaches the PM combustible temperature $T_1$, and when it is determined in Step S22 that the PM combustible temperature $T_1$ has been reached, the vehicle controller 10 executes the process of Step S25.

When the GPF temperature is equal to or higher than the PM combustible temperature $T_1$, in Step S25, the vehicle controller 10 determines whether or not the predetermined first condition that the driver does not intend a motoring operation is satisfied. That is, the vehicle controller 10 determines whether the vehicle is set to the charge mode, whether the SOC of the battery 3 is equal to or less than the predetermined value SOC 1, whether the vehicle is set to the EV priority traveling mode, whether there is a heating request, whether there is a driving force request, etc. If any of these apply and the first condition is satisfied, the vehicle controller 10 executes the process of Step S26.

On the other hand, if the first condition is not satisfied in Step S25, the process proceeds to Step S28 and the vehicle controller 10 performs a motoring operation. By motoring, air is sent to the high-temperature GPF 81, PM combustion is promoted, and the GPF 81 is refreshed. When the GPF 81 is refreshed and the differential pressure Pdif becomes equal to or less than a predetermined value, the vehicle controller 10 terminates the process of the motoring control based on PM accumulated amount.

In Step S26, the vehicle controller 10 determines whether the PM accumulated amount S of the GPF 81 is equal to or larger than the second predetermined amount S 2. When the PM accumulated amount S is equal to or larger than the second predetermined amount S 2, the process proceeds to Step S28 and the vehicle controller 10 performs a motoring operation. By motoring, air is sent to the high-temperature GPF 81, PM combustion is promoted, and the GPF 81 is refreshed. When the GPF 81 is refreshed and the differential pressure Pdif becomes equal to or less than a predetermined value, the vehicle controller 10 terminates the process of the motoring control based on PM accumulated amount.

In this way, when the PM accumulated amount S of the GPF 81 is equal to or larger than the second predetermined amount S 2 which is larger than the first predetermined amount $S_1$, even if the predetermined first condition is satisfied, a motoring operation is forcibly performed to refresh the GPF 81, and thus, it is possible to more reliably prevent the PM accumulated amount S of the GPF 81 from exceeding the allowable limit amount $S_{lim}$.

In Step S26, when the PM accumulated amount S is less than the second predetermined amount S 2, the process proceeds to Step S27, and the vehicle controller 10 prohibits motoring operation and terminates the process of the motoring control based on PM accumulated amount.

According to the hybrid vehicle 100 in the second embodiment described above, the following effects can be obtained.

When PM (particulate matters) of the second predetermined amount S 2, which is larger than the first predetermined amount $S_1$, or more is accumulated in the GPF 81 (particulate filter), the hybrid vehicle 100 performs a motoring operation to refresh the GPF 81 even if the predetermined first condition is satisfied. That is, when the volume of PM becomes equal to or larger than the second predetermined amount S 2, the regeneration of the GPF 81 is prioritized over the comfort of the driver. Thereby, it is possible to more reliably prevent the PM accumulated amount S of the GPF 81 from exceeding the allowable limit amount $S_{lim}$.

Third Embodiment

A hybrid vehicle 100 according to the third embodiment is described with reference to FIG. 7. Note that a component similar to a component in other embodiments has the same reference sign as used in other embodiments, and a description thereof is omitted.

Figure 7:
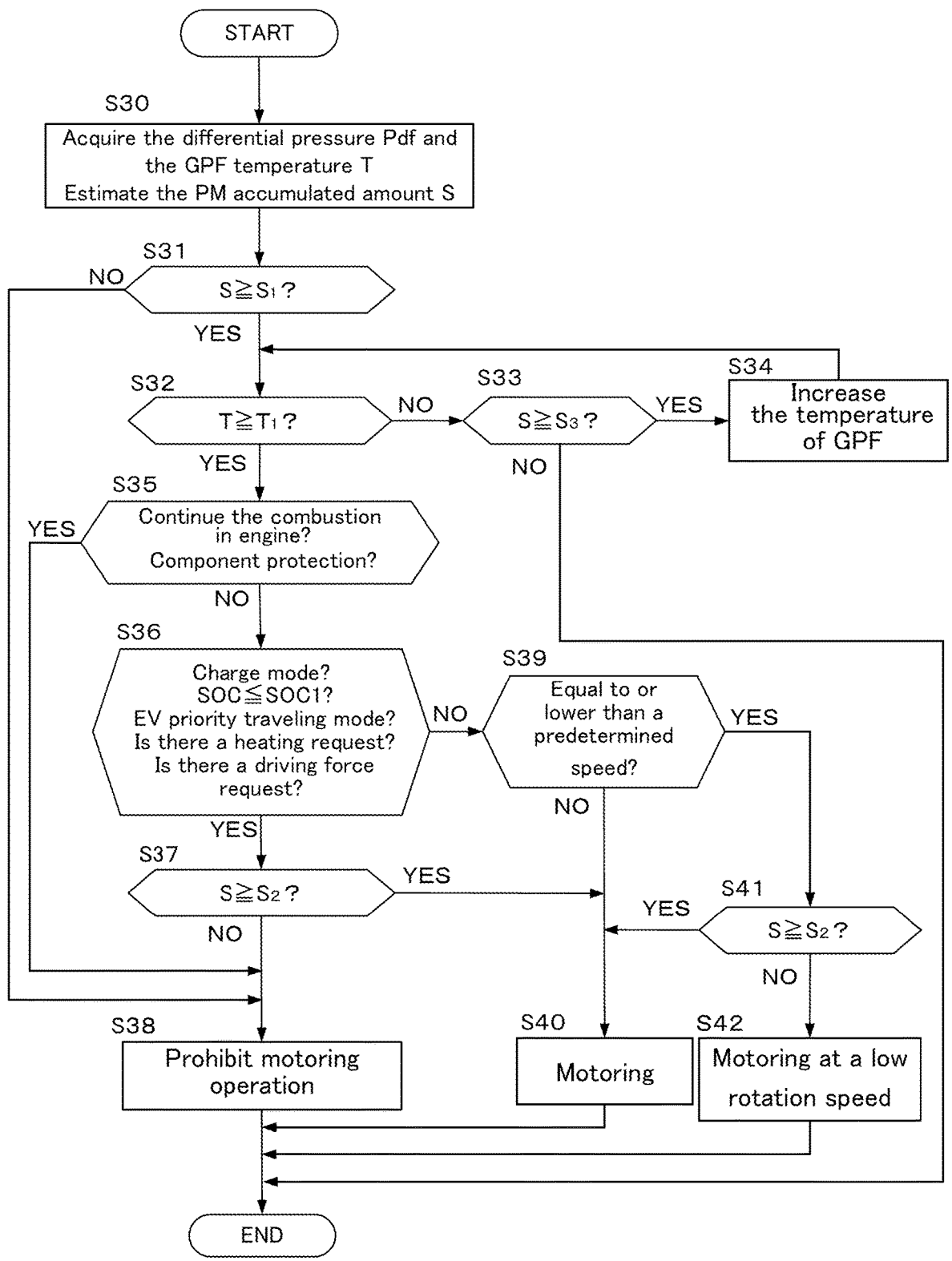
FIG. 7 is a flowchart illustrating a motoring control based on PM accumulated amount in the third embodiment.

FIG. 7 is a flowchart illustrating a motoring control based on PM accumulated amount in the third embodiment. This embodiment is different from other embodiments in prohibiting motoring operation when it is not preferable to stop the engine 1 or when it is necessary to prohibit motoring operation from the viewpoint of protecting the components that constitute the vehicle, and in reducing the rotation speed of motoring when the predetermined second condition is satisfied. Further, the following controls are each executed by the vehicle controller 10 at regular intervals.

In Step S30, the vehicle controller 10 receives the signal of the differential pressure Pdif and the signal of the GPF temperature T from the GPF system 8 and estimates the PM accumulated amount S of the GPF 81 based on the differential pressure Pdif.

In Step S31, the vehicle controller 10 determines whether the PM accumulated amount S of the GPF 81 is equal to or larger than the first predetermined amount $S_1$, and if the PM accumulated amount S is less than the first predetermined amount $S_1$, the process proceeds to Step S38 and the vehicle controller 10 does not perform a motoring operation.

On the other hand, when the PM accumulated amount S is equal to or larger than the first predetermined amount $S_1$, the process proceeds to Step S32 and the vehicle controller 10 determines whether the temperature T of the GPF 81 is equal to or higher than the PM combustible temperature $T_1$. If the temperature T of the GPF 81 is equal to or higher than the PM combustible temperature $T_1$, the vehicle controller 10 executes the process of Step S35. On the other hand, if the temperature T of the GPF 81 is lower than the PM combustible temperature $T_1$, the process proceeds to Step S33 and the vehicle controller 10 determines whether the PM accumulated amount S of the GPF 81 is equal to or larger than the PM accumulated amount $S_3$ of the start of temperature increase.

If the PM accumulated amount S is less than the PM accumulated amount $S_3$ of the start of temperature increase, the vehicle controller 10 terminates the process of the motoring control based on PM accumulated amount. On the other hand, if the PM accumulated amount S of the GPF 81 is equal to or larger than the PM accumulated amount $S_3$ of the start of temperature increase, the process proceeds Step S24, and the controller 50 drives the engine 1, increases the temperature T of the GPF 81, and returns to the process of Step S32.

The temperature of the GPF 81 is increased until it reaches the PM combustible temperature $T_1$, and when it is determined in Step S32 that the PM combustible temperature $T_1$ has been reached, the vehicle controller 10 executes the process of Step S25.

When the GPF temperature is equal to or higher than the PM combustible temperature $T_1$, in Step S35, the vehicle controller 10 determines whether the case corresponds to a case where it is necessary to continue the combustion in engine because the engine cannot be reignited once stopped, or a case where a motoring operation interferes with the components constituting the vehicle (motoring restriction requirements). In the first and second embodiments, when the PM accumulated amount S of the GPF 81 is equal to or larger than the first predetermined amount $S_1$ and the predetermined first condition is not satisfied, or when the PM accumulated amount S is equal to or larger than the second predetermined amount S 2, a motoring operation is performed. However, depending on the driving state of the vehicle, it may be unpreferable to stop the engine 1 or it may be preferable to restrict motoring operation from the viewpoint of protecting the components constituting the vehicle. Therefore, in this embodiment, the vehicle controller 10 determines whether it is necessary to continue the combustion in the engine 1 because the engine 1 cannot be reignited once stopped and whether a motoring operation interferes with the components constituting the vehicle, and if any of the above applies, the restriction of motoring operation is prioritized over the regeneration of the GPF 81.

The case where it is necessary to continue the combustion in the engine 1 because the engine 1 cannot be reignited once stopped is, for example, a case where the engine 1 cannot be reignited once stopped because the temperature of the battery 3 is low and the outside air temperature is low, etc. In such a case, it is necessary to prioritize the continuous operation of the engine 1 over the regeneration of the GPF 81. In addition, the case where it is preferable to restrict motoring operation from the viewpoint of protecting the components constituting the vehicle is, for example, a case where the temperature of the motor or inverter of the power generator 2 is high enough to interfere with the performance of the power generator 2 when a motoring operation is performed, or a case where the SOC of the battery 3 is too low to output electric power when a motoring operation is performed, etc. When the temperature of the motor or inverter of the power generator 2 is high, it is necessary to prioritize the restriction of motoring operation over the regeneration of the GPF 81. Further, when the SOC of the battery 3 is low, it is necessary to prioritize the charging of the battery 3 by driving the engine 1 over the regeneration of the GPF 81.

In Step S35, either when it is necessary to continue the combustion in engine because the engine cannot be reignited once stopped or when a motoring operation interferes with the components constituting the vehicle (motoring restriction requirements), the process proceeds to Step S38 and the vehicle controller 10 prohibits motoring operation.

Note that the motoring restriction requirements are not necessarily limited to the above cases, and when it is necessary to prioritize the combustion in the engine 1 or when a motoring operation interferes with the components constituting the vehicle, cases other than the above may be included in the motoring restriction requirements.

As described above, in this embodiment, regardless of the PM accumulated amount of the GPF 81, motoring operation is prohibited when it is not preferable to stop the engine 1 or when it is necessary to prohibit motoring operation from the viewpoint of protecting the components constituting the vehicle.

On the other hand, in Step S35, when neither it is necessary to continue the combustion in engine because the engine cannot be reignited once stopped nor a motoring operation interferes with the components constituting the vehicle, the vehicle controller 10 executes the process of Step S36.

In Step S36, the vehicle controller 10 determines whether or not the predetermined first condition that the driver does not intend a motoring operation is satisfied. That is, the vehicle controller 10 determines whether the vehicle is set to the charge mode, whether the SOC of the battery 3 is equal to or less than the predetermined value SOC 1, whether the vehicle is set to the EV priority traveling mode, whether there is a heating request, whether there is a driving force request, etc. If any of these apply and the first condition is satisfied, the vehicle controller 10 executes the process of Step S37.

In Step S37, the vehicle controller 10 determines whether the PM accumulated amount S of the GPF 81 is equal to or larger than the second predetermined amount S 2, and if the PM accumulated amount S is equal to or larger than the second predetermined amount S 2, the process proceeds to Step S40 and the vehicle controller 10 performs a motoring operation. When the combustion of PM is promoted, the GPF 81 is refreshed and the differential pressure Pdif becomes equal to or less than a predetermined value due to motoring, the vehicle controller 10 terminates the process of the motoring control based on PM accumulated amount. When the PM accumulated amount S is less than the second predetermined amount S 2, the process proceeds to Step S38, and the vehicle controller 10 prohibits motoring operation and terminates the process of the motoring control based on PM accumulated amount.

On the other hand, in Step S36, if the predetermined first condition is not satisfied, the vehicle controller 10 executes the process of Step S39.

In Step S39, the vehicle controller 10 determines whether or not the predetermined second condition that requests noise suppression is satisfied. When performing a motoring operation in Step S40, the vehicle controller 10 controls the rotation speed of motoring so that the amount of air that promotes the combustion of the PM accumulated in the GPF 81, preferably the optimum amount of air for combusting the PM, is supplied to the GPF 81. However, if a motoring operation is performed at such a rotation speed when noise suppression is requested, the comfort of the driver may be impaired due to the driving noise caused by the motoring operation. Therefore, in this embodiment, when the predetermined second condition requesting noise suppression is satisfied, a motoring operation is performed at a rotation speed lower than the rotation speed when a motoring operation is performed in Step S40 (predetermined rotation speed).

Specifically, when the vehicle speed is equal to or less than a predetermined speed, etc., even if the PM accumulated amount S of the GPF 81 is equal to or larger than the first predetermined amount $S_1$, a motoring operation is performed at a rotation speed lower than the predetermined rotation speed. When the vehicle speed is low enough to suppress the driving noise of the electric motor 4, for example, if a motoring operation is performed at the optimum rotation speed for promoting the combustion of PM, the comfort of the driver may be severely impaired as the driving noise from the motoring operation is more noticeable to the driver. Therefore, in this embodiment, in the case of a low vehicle speed, the driver's discomfort is reduced by performing a motoring operation at a rotation speed lower than the predetermined rotation speed.

In Step S39, the vehicle controller 10 determines whether the vehicle speed is equal to or less than the predetermined speed, and if so, the vehicle controller 10 determines that the second condition is satisfied.

Further, the second condition is not necessarily limited to the above case, and may include cases other than the above as long as noise suppression is requested.

On the other hand, if the predetermined second condition is not satisfied in Step S39, the process proceeds to Step S40 and the vehicle controller 10 performs a motoring operation. When the combustion of PM is promoted, the GPF 81 is refreshed and the differential pressure Pdif becomes equal to or less than a predetermined value due to motoring, the vehicle controller 10 terminates the process of the motoring control based on PM accumulated amount.

If the predetermined second condition is satisfied in Step S39, the vehicle controller 10 executes the process of Step S41. In Step S41, the vehicle controller 10 determines whether the PM accumulated amount S of the GPF 81 is equal to or larger than the second predetermined amount S 2. If the PM accumulated amount S is equal to or larger than the second predetermined amount S 2, the process proceeds to Step S40, and the vehicle controller 10 performs a motoring operation. When the combustion of PM is promoted, the GPF 81 is refreshed and the differential pressure Pdif becomes equal to or less than a predetermined value due to motoring, the vehicle controller 10 terminates the process of the motoring control based on PM accumulated amount.

As described above, even when the predetermined second condition is satisfied, if the PM accumulated amount S of the GPF 81 is equal to or larger than the second predetermined amount S 2, a motoring operation is performed at the predetermined rotation speed of Step S40 (for example, the optimum rotation speed for prioritizing the regeneration of the GPF 81 and promoting the combustion of PM). Thereby, it is possible to reliably prevent the PM accumulated amount S from exceeding the allowable limit amount $S_{lim}$.

On the other hand, in Step S41, when the PM accumulated amount S of the GPF 81 is less than the second predetermined amount S 2, the vehicle controller 10 executes the process of Step S42. In Step S42, the vehicle controller 10 performs a motoring operation at a rotation speed lower than the predetermined rotation speed, and terminates the process of the motoring control based on PM accumulated amount.

Thus, in this embodiment, when the predetermined second condition requesting noise suppression is satisfied, a motoring operation is performed at a rotation speed lower than the predetermined rotation speed to reduce the driver's discomfort even if the PM accumulated amount S of the GPF 81 is equal to or larger than the first predetermined amount $S_1$.

It is noted that, in this embodiment, all of the processes of Step S35 for determining whether a motoring restriction requirement is satisfied, Step S39 for determining whether or not the predetermined second condition is satisfied, and Step S42 for controlling the engine 1 based on the determination of Step S39 are executed, but it is also possible to execute only the process of Step S35 or only the processes of Steps S39 and S42.

According to the hybrid vehicle 100 in the third embodiment described above, the following effects can be obtained.

The hybrid vehicle 100 prohibits motoring operation when a motoring restriction requirement is satisfied even if PM (particulate matters) of the first predetermined amount $S_1$ or more is accumulated and the predetermined first condition is not satisfied, or even if PM (particulate matters) of the second predetermined amount S 2 or more is accumulated. That is, when it is necessary to continue the combustion in the engine 1 because the engine 1 cannot be reignited once stopped, or when a motoring operation interferes with the components constituting the vehicle, motoring operation is prohibited. Thereby, it is possible to prevent a motoring operation from being performed for GPF regeneration even when there is a risk of causing the engine 1 or other components to malfunction.

Further, the hybrid vehicle 100 performs a motoring operation at a rotation speed lower than the predetermined rotation speed if the predetermined second condition requesting noise suppression is satisfied when the motoring operation is performed with PM (particulate matters) of the first predetermined amount $S_1$ or more accumulated. Thereby, when noise suppression is requested, it is possible to perform a motoring operation at the predetermined rotation speed (for example, the optimum rotation speed for promoting the combustion of PM) to prevent the comfort of the driver from being impaired by the driving noise caused by the motoring operation.

Further, the hybrid vehicle 100 performs a motoring operation at a rotation speed lower than the predetermined rotation speed if the vehicle speed is equal to or less than the predetermined speed when the motoring operation is performed with PM (particulate matters) of the first predetermined amount Si or more accumulated. When the vehicle speed is low enough to suppress the driving noise of the electric motor 4, if a motoring operation is performed at the predetermined rotation speed (for example, the optimum rotation speed for promoting the combustion of PM), the comfort of the driver may be severely impaired as the driving noise from the motoring operation is more noticeable to the driver. In contrast, in this embodiment, in the case of a low vehicle speed, the driver's discomfort can be reduced by performing a motoring operation at a rotation speed lower than the predetermined rotation speed, and it is possible to prevent the comfort of the driver from being impaired by the driving noise caused by the motoring operation.

Fourth Embodiment

A hybrid vehicle 100 according to the fourth embodiment is described with reference to FIG. 8. Note that a component similar to a component in other embodiments has the same reference sign as used in other embodiments, and a description thereof is omitted.

Figure 8:
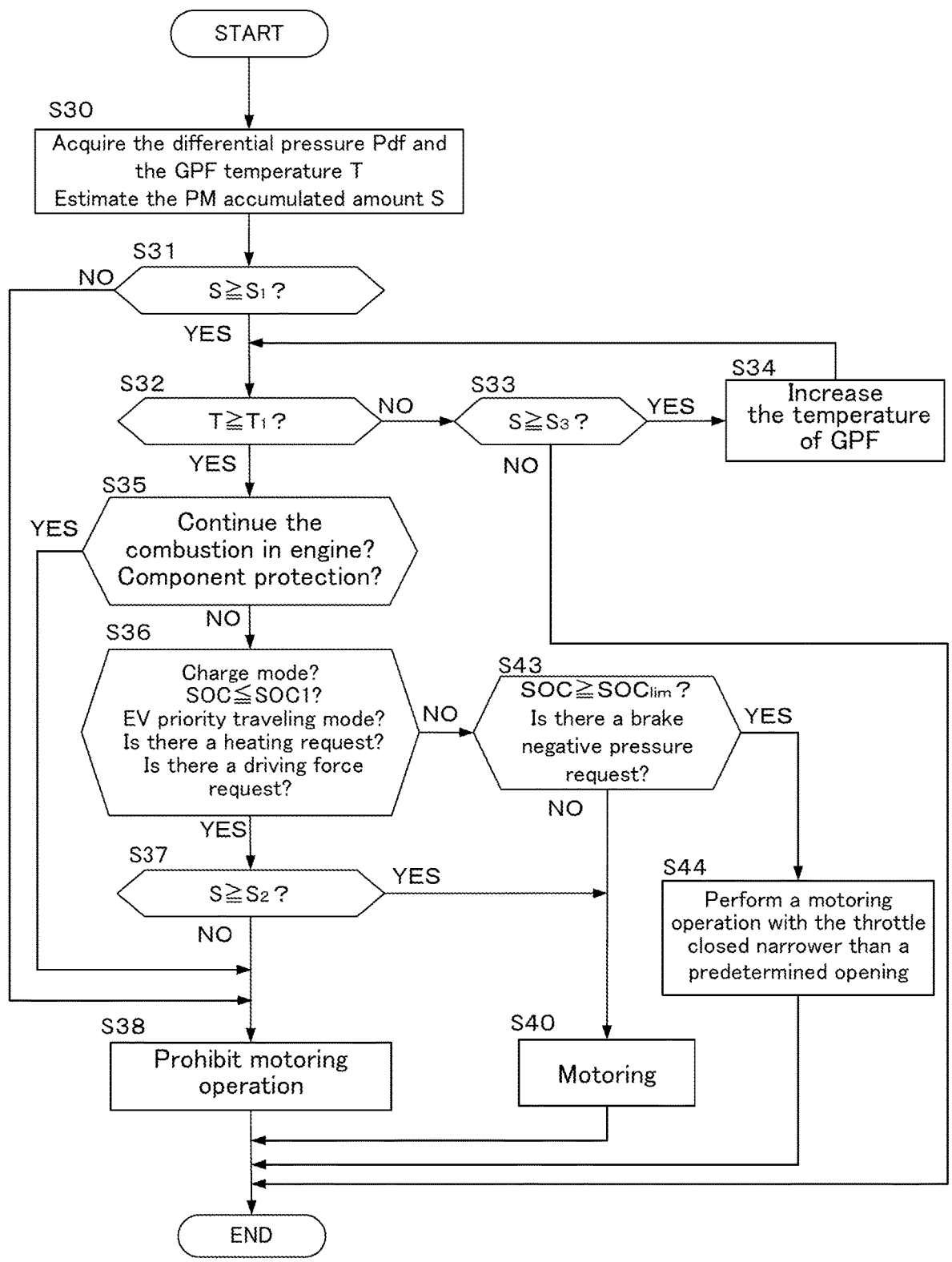
FIG. 8 is a flowchart illustrating a motoring control based on PM accumulated amount in the fourth embodiment.

FIG. 8 is a flowchart illustrating a motoring control based on PM accumulated amount in the fourth embodiment. This embodiment is different from other embodiments in performing a motoring operation with the throttle closed narrower than a predetermined opening when a predetermined third condition is satisfied. It is noted that the following controls are each executed by the vehicle controller 10 at regular intervals.

Step S30 to Step S38 are the same as in the third embodiment. That is, in Step S30, the vehicle controller 10 estimates the PM accumulated amount S, and when the PM accumulated amount S is less than the first predetermined amount $S_1$, the process proceeds to Step S38, and the vehicle controller 10 does not perform a motoring operation and terminates the process of the motoring control based on PM accumulated amount. When the PM accumulated amount S is equal to or larger than the first predetermined amount $S_1$, whether the temperature T of the GPF 81 is equal to or higher than the PM combustible temperature $T_1$ is determined, and if the temperature T of the GPF 81 is equal to or higher than the PM combustible temperature $T_1$, the process of Step S35 is executed. If the temperature T of the GPF 81 is lower than the PM combustible temperature $T_1$, then if the PM accumulated amount S is less than the PM accumulated amount $S_3$ of the start of temperature increase, the process of the motoring control based on PM accumulated amount is terminated, and if the PM accumulated amount S is equal to or larger than the PM accumulated amount $S_3$ of the start of temperature increase, the temperature of the GPF 81 is increased by the engine drive, and then the process of Step S35 is executed.

In Step S35, the vehicle controller 10 determines whether a motoring restriction requirement is satisfied, and when a motoring restriction requirement is satisfied, the vehicle controller 10 prohibits motoring operation and terminates the process of the motoring control based on PM accumulated amount. When no motoring restriction requirement is satisfied, the process of Step S36 is executed.

In Step S36, the vehicle controller 10 determines whether the predetermined first condition that the driver does not intend a motoring operation is satisfied, and if the first condition is satisfied, the process proceeds to Step 37 and the vehicle controller 10 determines whether the PM accumulated amount S of the GPF 81 is equal to or larger than the second predetermined amount S 2. When the PM accumulated amount S is equal to or larger than the second predetermined amount S 2, if the process proceeds to Step S40, and the vehicle controller 10 performs a motoring operation, refreshes the GPF 81, and the differential pressure Pdif becomes equal to or less than the predetermined value, the vehicle controller 10 terminates the process of the motoring control based on PM accumulated amount. When the PM accumulated amount S is less than the second predetermined amount S 2, the process proceeds to Step S38, and the vehicle controller 10 prohibits motoring operation and terminates the process of the motoring control based on PM accumulated amount.

On the other hand, in Step S36, if the predetermined first condition is not satisfied, the vehicle controller 10 executes the process of Step S43.

In Step S43, the vehicle controller 10 determines whether or not the predetermined third condition that the throttle should be closed narrower than the predetermined opening is satisfied. When performing a motoring operation in Step S40, the vehicle controller 10 controls the throttle opening so that the amount of air that promotes the combustion of the PM accumulated in the GPF 81, preferably the optimum amount of air for promoting the combustion of the PM, is supplied to the GPF 81. However, depending on the driving state of the vehicle, inconvenience may occur if a motoring operation is performed with such a throttle opening in relation to the performance of other components. Therefore, in this embodiment, when the predetermined third condition that the throttle should be closed narrower than the predetermined opening in relation to the performance of other components is satisfied, a motoring operation is performed with the throttle closed narrower than the opening when a motoring operation is performed in Step S40 (predetermined throttle opening).

Specifically, when the SOC of the battery 3 is equal to or larger than the allowable charge upper limit value $SOC_{lim}$ or when there is a brake negative pressure request, a motoring operation is performed with the throttle closed narrower than the predetermined opening even if the PM accumulated amount S of the GPF 81 is equal to or larger than the first predetermined amount $S_1$. The allowable charge upper limit value $SOC_{lim}$ of the SOC of the battery 3 is set to a value large enough to request discharging. That is, in this embodiment, when the SOC of the battery 3 is large and discharging is requested, a motoring operation is performed in a state where the throttle is closed narrower than the predetermined throttle opening and a pump loss is increased. Thereby, the electric power consumption of the power generator 2 can be increased, and the battery 3 can be protected more reliably. In addition, when a brake negative pressure request is made, it is necessary to control to close the throttle and increase the intake negative pressure, and thus, the throttle is closed narrower than the predetermined throttle opening to perform a motoring operation.

In Step S43, the vehicle controller 10 determines whether the SOC of the battery 3 is equal to or larger than the allowable charge upper limit value $SOC_{lim}$ and whether there is a brake negative pressure request, and if either applies, the vehicle controller 10 determines that the third condition is satisfied.

It is noted that the third condition is not necessarily limited to the above case, and may include cases other than the above as long as the throttle should be closed narrower than the predetermined opening in relation to the performance of other components.

If the predetermined third condition is satisfied in Step S43, the vehicle controller 10 executes the process of Step S44. In Step S44, the vehicle controller 10 performs a motoring operation with the throttle closed narrower than the predetermined throttle opening, and terminates the process of the motoring control based on PM accumulated amount.

On the other hand, in Step S43, if the predetermined third condition is not satisfied, the process proceeds to Step S40, and the vehicle controller 10 performs a motoring operation with the predetermined throttle opening (for example, a throttle opening such that the optimum amount of air for promoting the combustion of PM is supplied to the GPF 81). When the combustion of PM is promoted, the GPF 81 is refreshed and the differential pressure Pdif becomes equal to or less than a predetermined value due to motoring, the vehicle controller 10 terminates the process of the motoring control based on PM accumulated amount.

Therefore, in this embodiment, when required in relation to the performance of other components, a motoring operation is performed with the throttle closed narrower than the predetermined throttle opening. Thereby, it is possible to prevent inconvenience from occurring in relation to the performance of other components by performing the motoring operation.

It is noted that, in this embodiment, all of the processes of Step S35 for determining whether a motoring restriction requirement is satisfied, Step S43 for determining whether or not the predetermined third condition is satisfied, and Step S44 for controlling the throttle opening based on the determination of Step S43 are executed, but it is also possible to execute only the process of Step S35 or only the processes of Steps S43 and S44.

Further, in this embodiment, the processes of Step (S39) for determining whether or not the predetermined second condition is satisfied and Step (S42) for controlling the engine 1 based on the determination of Step (S39) in the third embodiment are not executed, but the processes of these Steps may be added to this embodiment.

According to the hybrid vehicle 100 in the fourth embodiment described above, the following effects can be obtained.

The hybrid vehicle 100 performs a motoring operation with the throttle closed narrower than the predetermined opening if the SOC of the battery 3 is equal to or larger than the allowable charge upper limit value SOC urm when the motoring operation is performed with PM (particulate matters) of the first predetermined amount $S_1$ or more accumulated. Thereby, when the SOC of the battery 3 is large and discharging is requested, the electric power consumption of the power generator 2 can be increased, and the battery 3 can be protected more reliably.

Further, the hybrid vehicle 100 performs a motoring operation with the throttle closed narrower than the predetermined opening if there is a brake negative pressure request when the motoring operation is performed with PM (particulate matters) of the first predetermined amount $S_1$ or more accumulated. When a motoring operation is performed to promote the combustion of the PM accumulated in the GPF 81, the vehicle controller 10 controls the throttle to the predetermined opening (for example, an opening such that the optimum amount of air for promoting the combustion of PM is supplied to the GPF 81). However, even at the time of brake negative pressure request, if a motoring operation is performed with such a throttle opening, there is a risk that sufficient intake negative pressure cannot be obtained. In contrast, in this embodiment, a motoring operation is performed with the throttle closed narrower than the predetermined opening at the time of brake negative pressure request. Thereby, it is possible to prevent the required braking performance from being lost at the time of break negative pressure request.

It is noted that, in any of the embodiments, there has been described the control for prohibiting motoring operation even if PM of the first predetermined amount $S_1$ or more is accumulated in the GPF 81 when the predetermined first condition is satisfied, and the increase of the GPF temperature may be similarly controlled in a manner of prohibiting the driving of the engine 1 when a predetermined condition is satisfied. For example, when the comfort of the driver is impaired by an engine drive, even if the state point in FIG. 3 or FIG. 5 is in the GPF temperature increasing region R2, the increase of the GPF temperature may be controlled so as to prohibit the driving of the engine 1.

Further, in the second, third and fourth embodiments, there has been described that a motoring operation is more forcibly performed when PM of the second predetermined amount S 2 or more is accumulated in the GPF 81, and the increase of the GPF temperature may also be controlled in a manner of increasing the temperature of the GPF 31 by driving the engine 1 more forcibly when the PM accumulated amount exceeds the predetermined amount.

While the embodiments of the present invention have been described above, the above-described embodiments only show part of application examples of the present invention and are not intended to limit the technical scope of the present invention to the specific configurations of the above-described embodiments.

Although each of the above embodiments has been described as a single embodiment, the embodiments may be combined as appropriate.

The invention claimed is:

1. A control method for a hybrid vehicle comprising an engine with an engine throttle, a power generator that charges a battery using power of the engine, an electric motor that drives a driving wheel by electric power of the battery, and a particulate filter that collects particulate matter contained in exhaust gas from the engine, the control method comprising:

controlling a motoring operation of rotating the engine at a first speed by the power generator to supply air to the particulate filter, by supplying electric power from the battery to the power generator, which comprises:
upon determining that (i) particulate matter of a first predetermined amount or more is accumulated in the particulate filter and (ii) no brake negative pressure request has been made, performing the motoring operation with a throttle opening of the engine throttle in a first state,
upon determining that (i) particulate matter of a first predetermined amount or more is accumulated in the particulate filter and (ii) a brake negative pressure request has been made, performing the motoring operation with the throttle opening of the engine throttle in a second state in which the throttle opening is narrower than in the first state, wherein the brake negative pressure request is a request to control the throttle opening of the engine throttle to increase intake negative pressure.

2. The control method for the hybrid vehicle according to claim 1, wherein:
the step of controlling the motoring operation further comprises:
upon determining that (i) a first condition is satisfied, and (ii) particulate matter less than a second predetermined amount is accumulated in the particulate filter, prohibiting the motoring operation; and
upon determining that (i) the first condition is satisfied, and (ii) particulate matter of the second predetermined amount or more is accumulated in the particulate filter, performing the motoring operation; wherein:
the second predetermined amount is larger than the first predetermined amount; and
the first condition comprises at least one of:
a charge mode, in which charging of the battery is requested by a driver, is set;
an EV priority traveling mode, in which charging of the battery by the engine is restricted, is set;
a state of charge of the battery is equal to or less than a predetermined value;
a heating is requested; or
a driving force is requested.

3. The control method for the hybrid vehicle according to claim 1, wherein:
the step of controlling the motoring operation further comprises:
when it is necessary to continue combustion of the engine because (i) the engine cannot be reignited once stopped or (ii) the motoring operation interferes with a component of the vehicle, prohibiting the motoring operation even upon determining that (iii) particulate matter of the first predetermined amount or more is accumulated in the particulate filter and (iv) a first condition is not satisfied; wherein the first condition is at least one of:
a charge mode, in which charging of the battery is requested by a driver, is set,
an EV priority travelling mode, in which charging of the battery by the engine is restricted, is set,
a state of charge of the battery is equal to or less than a predetermined value,
a heating is requested, or
a driving force is requested.

4. The control method for the hybrid vehicle according to claim 2, wherein:
the step of controlling the motoring operation further comprises:
when it is necessary to continue combustion of the engine because (i) the engine cannot be reignited once stopped or (ii) the motoring operation interferes with a component of the vehicle, prohibiting the motoring operation even though (iii) particulate matter of the second predetermined amount or more is accumulated in the particulate filter.

5. The control method for the hybrid vehicle according to claim 2, wherein:
the step of controlling the motoring operation further comprises:
upon determining that (i) particulate matter of the first predetermined amount or more is accumulated in the particulate filter and (ii) particulate matter less than the second predetermined amount is accumulated in the particulate filter and (iii) a predetermined second condition is satisfied, performing the motoring operation by rotating the engine at a second speed lower than the first speed.

6. The control method for the hybrid vehicle according to claim 5, wherein:
the predetermined second condition is that a vehicle speed is equal to or less than a predetermined speed.

7. The control method for the hybrid vehicle according to claim 1, wherein:
the step of controlling the motoring operation further comprises:
upon determining that (i) particulate matter of the first predetermined amount or more is accumulated in the particulate filter and (ii) a state of charge of the battery is equal to or larger than an allowable charge upper limit value, performing the motoring operation with the throttle opening of the engine throttle in the second state.

8. A control device for a hybrid vehicle, comprising:
an engine with an engine throttle; a power generator that charges a battery using power of the engine; an electric motor that drives a driving wheel by electric power of the battery; a particulate filter that collects particulate matter contained in exhaust gas from the engine; and
a controller configured to perform a motoring operation of rotating the engine by the power generator to supply air to the particulate filter, by supplying electric power from the battery to the power generator, the controller configured to:
upon determining that (i) particulate matter of a first predetermined amount or more is accumulated in the particulate filter and (ii) no brake negative pressure request has been made, perform the motoring operation with a throttle opening of the engine throttle in a first state,
upon determining that (i) particulate matter of a first predetermined amount or more is accumulated in the particulate filter and (ii) a brake negative pressure request has been made, perform the motoring operation with the throttle opening of the engine throttle in a second state in which the throttle opening is narrower than in the first state,
wherein the brake negative pressure request is a request to control the throttle opening of the engine throttle to increase intake negative pressure.

* * * * *